US010543461B2

(12) United States Patent
Kim et al.

(10) Patent No.: US 10,543,461 B2
(45) Date of Patent: Jan. 28, 2020

(54) CARTRIDGE-TYPE HOLLOW FIBER MEMBRANE MODULE COMPRISING SUBMERGED HOLLOW FIBER MEMBRANE UNIT MODULE WITH FREE END AND SUBMERGED APPARATUS FOR WATER TREATMENT COMPRISING AIR DIFFUSER APPARATUS CAPABLE OF INTERMITTENT/CONTINUOUS AERATION AND ITS AERATION METHOD

(71) Applicant: Econity Co., Ltd., Cheoin-gu, Yongin-si, Gyeonggi-do (KR)

(72) Inventors: Jinho Kim, Yongin-si (KR); Minsoo Park, Yongin-si (KR); Kongsuen Hong, Hwaseong-si (KR); Namseok Gil, Yongin-si (KR); Hanhyoung Cho, Osan-si (KR); Byungho Choi, Suwon-si (KR)

(73) Assignee: Econity Co., Ltd. (KR)

( * ) Notice: Subject to any disclaimer, the term of this patent is extended or adjusted under 35 U.S.C. 154(b) by 478 days.

(21) Appl. No.: 14/423,076

(22) PCT Filed: Mar. 25, 2014

(86) PCT No.: PCT/KR2014/002509
§ 371 (c)(1),
(2) Date: Feb. 20, 2015

(87) PCT Pub. No.: WO2015/099245
PCT Pub. Date: Jul. 2, 2015

(65) Prior Publication Data
US 2016/0030889 A1 Feb. 4, 2016

(30) Foreign Application Priority Data
Dec. 23, 2013 (KR) .................. 10-2013-0161421

(51) Int. Cl.
*B01D 65/02* (2006.01)
*B01D 61/18* (2006.01)
(Continued)

(52) U.S. Cl.
CPC ............. *B01D 65/02* (2013.01); *B01D 61/18* (2013.01); *B01D 63/024* (2013.01);
(Continued)

(58) Field of Classification Search
CPC ..................................................... B01D 63/02
See application file for complete search history.

(56) References Cited

U.S. PATENT DOCUMENTS 5,922,201 A 7/1999 Yamamori et al.
6,325,928 B1 12/2001 Pedersen et al.
(Continued)

FOREIGN PATENT DOCUMENTS

JP H07-155564 6/1995
JP H07-178321 7/1995
(Continued)

*Primary Examiner* — Peter Keyworth
(74) *Attorney, Agent, or Firm* — Thorpe North & Western

(57) ABSTRACT

Provided is a cartridge-type hollow fiber membrane module including a hollow fiber membrane unit module with a free end and a cartridge frame and a submerged water treatment apparatus including an air diffuser apparatus capable of intermittent and continuous aeration disposed below the hollow fiber membrane module, wherein the cartridge-type membrane module with the free end using the coarse bubble generating air diffuser apparatus capable of intermittent/continuous aeration in conjunction with an air accumulation pipe may control aeration/non-aeration cycles through adjustment of the volume of an air chamber and an amount of inflow air and carry out continuous aeration based on changes in raw water load and a concentration of solids in a membrane separation tank.

14 Claims, 13 Drawing Sheets

(51) Int. Cl.
  *B01D 63/02* (2006.01)
  *B01D 69/08* (2006.01)
  *C02F 1/44* (2006.01)

(52) U.S. Cl.
  CPC .......... *B01D 63/026* (2013.01); *B01D 69/08* (2013.01); *C02F 1/44* (2013.01); *C02F 1/444* (2013.01); *B01D 2313/26* (2013.01); *B01D 2313/54* (2013.01); *B01D 2315/06* (2013.01)

(56) References Cited

U.S. PATENT DOCUMENTS

| | | | |
|---|---|---|---|
| 8,372,276 B2 * | 2/2013 | Zha | B01D 63/024 210/150 |
| 9,206,057 B2 | 12/2015 | Zha et al. | |
| 2004/0060442 A1 * | 4/2004 | Nakahara | B01D 63/02 96/8 |
| 2009/0152180 A1 * | 6/2009 | Nishimori | B01D 61/18 210/137 |
| 2010/0170847 A1 | 7/2010 | Zha et al. | |
| 2012/0012514 A1 * | 1/2012 | Sasakawa | B01D 63/026 210/232 |

FOREIGN PATENT DOCUMENTS

| | | | |
|---|---|---|---|
| JP | H11-128692 | 5/1999 | |
| JP | H11-347374 | 12/1999 | |
| JP | 3130997 | 1/2001 | |
| JP | 5038038 | 10/2012 | |
| KR | 2000-0050208 | 8/2000 | |
| KR | 10-0552637 | 2/2006 | |
| KR | 10-2006-0122024 | 11/2006 | |
| KR | 10-2010-0023920 | 3/2010 | |
| KR | 10-2012-0093402 | 8/2012 | |
| KR | 10-1241950 | 3/2013 | |
| WO | WO 2006/126833 | 11/2006 | |
| WO | WO-2006/126833 | * 11/2006 | ............ B01D 63/02 |

* cited by examiner

CARTRIDGE-TYPE HOLLOW FIBER MEMBRANE MODULE COMPRISING SUBMERGED HOLLOW FIBER MEMBRANE UNIT MODULE WITH FREE END AND SUBMERGED APPARATUS FOR WATER TREATMENT COMPRISING AIR DIFFUSER APPARATUS CAPABLE OF INTERMITTENT/CONTINUOUS AERATION AND ITS AERATION METHOD

TECHNICAL FIELD

The present disclosure relates to a cartridge-type hollow fiber membrane module including a submerged hollow fiber membrane unit module with a free end, an air diffuser apparatus capable of intermittent/continuous aeration, and a water treatment method using the same, and more particularly, to a submerged hollow fiber membrane unit module with a free end installed vertically in the water and including hollow fiber membranes closed at top and open at bottom and bonded to a manifold at bottom to collect treated water, and a cartridge-type hollow fiber membrane module including submerged hollow fiber membrane unit modules received at a predetermined interval and a water collecting header connected thereto in order to collect treated water obtained by treating wastewater; an air diffuser apparatus which carries out intermittent aeration using a diffuser in conjunction with an air accumulation pipe to reduce an excessive amount of cleaning air known as a drawback of a traditional membrane filtration system and which controls an intermittent aeration cycle and intermittent aeration/continuous aeration operation based on changes in raw water and a concentration of solids in a membrane separation tank; and a method that applies the air diffuser apparatus to the cartridge-type hollow fiber membrane module with the free end to achieve effective wastewater treatment, effective cleaning for preventing contamination of the hollow fiber membrane, and energy efficiency improvement through a reduction in amount of cleaning air.

BACKGROUND ART

To install a hollow fiber membrane in a water filtration plant quickly and readily, the hollow fiber membrane is generally provided in a form of a module. The hollow fiber membrane module includes multiple strands or bundles of hollow fiber membranes and a manifold of various shapes, and the manifold functions to support and fix the multiple strands or bundles of hollow fiber membranes, and to collect treated water permeating pores of the hollow fiber membranes.

Examples of the hollow fiber membrane module are disclosed in Japanese Patent Publication No. 7-155564, Japanese Patent Publication No. 7-178321, and Korean Patent Publication No. 10-2000-0050208, and an example of the cartridge-type hollow fiber membrane module easily detachable from a holding frame for the hollow fiber membrane module is disclosed in U.S. Pat. No. 6,325,928, and as known in the previous development process, objectives to take notice of in design of the hollow fiber membrane module are integrity, easiness in mounting and detaching, and easy cleaning.

The term "integrity" refers to providing a maximized surface area of hollow fiber membranes in an installation space of the same volume, the term "easiness in mounting and detaching" refers to minimization of a troublesome hand work needed to mount/detach the hollow fiber membrane module in/from the holding frame for the hollow fiber membrane module, and the term "easy cleaning" refers to a simple process of removing materials clogged between the membranes of the hollow fiber membrane module occurred during operation of a water filtration plant.

With the advancement of hollow fiber membrane modules, there were considerable improvements in integrity, easiness in mounting and detaching, and easy cleaning, but there is still room for improvement. Particularly, in the aspect of easy cleaning, more improvements are required, and in the case of filtration involving immersing a hollow fiber membrane module in wastewater with a high concentration of floating matters, there is a phenomenon, called intermembrane clogging, in which floating matters accumulate on the hollow fiber membrane surface and between hollow fiber membranes, resulting in a reduction in effective surface area of the hollow fiber membranes for use in water permeation. In the event of intermembrane clogging, a water permeation rate remarkably reduces and a service life of the hollow fiber membrane module decreases, and to alleviate the intermembrane clogging phenomenon, it is general to continuously remove floating matters accumulated on the hollow fiber membrane surface and between the hollow fiber membranes by shaking the hollow fiber membranes through air aeration, turbulence formation, and generation of ultrasonic waves or vibration from the bottom of the hollow fiber membrane module during operation of the water filtration plant. However, in spite of this solution, intermembrane clogging goes beyond an allowable level after a long-term operation.

Let us see a structure of a traditional general submerged hollow fiber membrane module. A hollow fiber membrane is fixed at both ends. Although air aeration or turbulence is formed by an air diffuser apparatus, there is a limitation on movement of the hollow fiber membrane. Despite a cross flow of treated water or a cleaning process by supplied air, it is not easy to remove contaminants accumulated on the hollow fiber membrane surface, and because the air diffuser apparatus is installed below the module, cleaning air is not directly transferred to the hollow fiber membrane module, so an air loss is large and a high rate of air aeration is additionally required, resulting in a high operation cost.

Dissimilar to the membrane module having the hollow fiber fixed at both ends, a submerged hollow fiber membrane with a free end that is fixed at one end and not fixed at the other end is typically disclosed in Japanese Patent No. JP3130997 by Mitsubishi Rayon and Japanese Patent Publication No. 11-128692 by Toray, and one of the problems that are usually found in a module including the hollow fiber membrane fixed only at one end is entanglement of the hollow fiber membrane due to an abnormal flow in a fluid flow of treated water generated by the collapse of the hollow fiber membrane in the module or different amounts of air during operation, and when mechanical stresses caused by the abnormal flow concentrate at the tangled part, the hollow fiber membrane may be cut off.

More specifically, the collapse of the hollow fiber membrane in the module often occurs when taking the hollow fiber membrane module out of an aeration tank for the purpose of cleaning or maintenance and repair, and a fluid flow goes from a region with a larger amount of air supply to a region with a smaller amount of air supply during operation, and along the flow, the hollow fiber membrane has an orientation, thus inducing entanglement, or when the hollow fiber membrane module gets inclined at any one side, a contact location of a flow of supplied air and the module differs, which fails to induce a fluid flow of a predetermined pattern, resulting in entanglement, and in the end, cut-off of the hollow fiber membrane.

These related arts have the following disadvantages; a manufacturing cost increases due to installation of a support for preventing the collapse caused by a long length of the hollow fiber membrane, damage occurs in the hollow fiber membrane by friction between the support installed additionally and the hollow fiber membrane with flowability, and contaminants accumulate near an additional mechanical structure, and it is difficult to remove the contaminants. Furthermore, due to the characteristics of the long hollow fiber membrane and the module, work efficiency in constructing a water treatment facility or installing the module reduces, and when a hollow fiber membrane is contaminated during use, it is impossible to remove contaminants after and re-installation in a simple and convenient manner of easily taking out a cartridge, cleaning through high pressure water cleaning, and re-installing the cartridge, so the convenience in maintenance and repair for solving problems that may occur during operation is low.

It is known that a submerged water treatment system needs an air cleaning method using bubbles as a solution to a high level of membrane fouling. However, the air cleaning method using bubbles has a drawback of enormous energy consumption as noted, and studies have been made to increase efficiency of an air diffuser apparatus.

To provide gas enough to effectively clean the membrane surface with reduced energy consumption, a cyclic aeration system designed to provide bubbles periodically is required, and to implement the periodic aeration operation, generally a complex valve array and a control means are needed, which tends to increase an initial system cost for the complex valve and switching array and a subsequent maintenance and repair cost. Also, within a large scale system, the number of circulations is limited by a functional constraint of a mechanical valve. Thus, it is preferred to provide a method for energy efficient cleaning while not requiring to control the operation by means of complex valve switching.

To overcome this limitation, an air aeration method using an airlift pump has been developed, and its related art is disclosed Korean Patent Publication No. 2010-0023920 by Siemens directed to membrane cleaning using an airlift pump and Korean Patent Publication No. 2010-0012844 and Korean Patent Publication No. 2012-0093402 directed to a method and apparatus for membrane cleaning using a pulsed airlift pump, but these methods have a limitation on arrangement and shape of a membrane module due to creation of macro bubbles through an intermittent or pulsed fluid flow irregularly generating along the membrane surface to remove contaminants from the membrane surface, and allow intermittent aeration only.

Accordingly, there is a need for technology development of an air diffuser apparatus that may allow for intermittent aeration to reduce an amount of cleaning air, allow for various arrangements based on arrangement and shape of a membrane module, and variably control the continuous aeration operation based on changes in raw water and a concentration of solids in a membrane separation tank, and a water treatment method using the same.

SUMMARY

Technical Problem

The present disclosure is designed to solve the problems of the related arts, and therefore the present disclosure is intended to apply a hollow fiber membrane with a free end to a cartridge-type hollow fiber membrane module to increase mobility of the hollow fiber membrane, which increases cleaning performance with a small amount of air and reduces an amount of cleaning air for use in contamination removal in an aeration process for impeding and eliminating the impurity clogging occurring on a traditional submerged membrane module, thereby improving energy efficiency in a water treatment process.

Also, the present disclosure is intended to solve a problem that is usually found in a hollow fiber membrane module including a hollow fiber membrane with one free end and the other fixed end, the problem with entanglement of the hollow fiber membrane due to an abnormal flow in a fluid flow of treated water generated by the collapse of the hollow fiber membrane in the module or different amounts of air during operation, and to avoid this drawback, the present disclosure prevents the entanglement of the hollow fiber membrane without a support or guide member commonly used in the art, reduce the likelihood of additional contamination that may occur near an additional mechanical structure, and eliminate the risk of breakage caused by friction between the additional structure and the membrane module, to ensure a long-term operation of the membrane module.

Also, the present disclosure is intended to facilitate discharge of cleaning air by the application of the cartridge-type structure using the short hollow fiber membrane and reduce an interval between cleaning air movement channels, thereby increasing the integrity of the hollow fiber membrane and consequently the integrity per module, and increasing the size of inner/outer diameter of the hollow fiber membrane due to the increased integrity, resulting in a reduction in a loss of pressure in the hollow fiber membrane.

Also, the present disclosure is intended to allow easy handling with the use of an advantage of a traditional replaceable cartridge-type membrane module and a short membrane length so that one person can deliver and mount, thereby improving work efficiency in construction of water treatment facility or module installation, and to stack a multi-story cartridge on the cartridge, thereby providing customized construction for installation in buildings of different heights or depths, and in the event of contamination of a hollow fiber membrane during use, to facilitate contaminant removal through high pressure water cleaning after easily taking out and turning a cartridge and re-installation, thereby increasing the convenience in maintenance and repair for solving problems that may occur during operation.

Also, the present disclosure is intended to reduce non-uniformity in amount of treated water caused by a distance between a manifold and a water collecting outlet located at an upper portion of a cartridge, in the discharge of treated water collected in the manifold below the water collecting part via the water collecting outlet located at the upper portion of the cartridge, through effective design of an internal structure of a water collecting part in a cartridge-type hollow fiber membrane module, to mitigate a difference in flow amount between unit modules, thereby achieving equal treatment.

Also, the present disclosure is intended to attain effective water treatment and cleaning by a uniform flow velocity and a uniform flow velocity distribution in the supply of cleaning air and a flow of water in an upward direction through effective design of a shape of a header corresponding to a lower portion of a unit module.

Also, the present disclosure is intended to provide an air diffuser apparatus that may carry out intermittent aeration using an air accumulation pipe without a separate mechanical control device such as a valve to reduce an amount of cleaning air needed to prevent the membrane fouling of a cartridge-type membrane module with a free end.

Also, the present disclosure is intended to provide an air diffuser apparatus suitable for a cartridge-type membrane module with a free end that may increase a period of time during which bubbles are in contact with the membrane surface by using coarse bubbles smaller than macro bubbles to substantially increase an aeration time, adjust aeration/non-aeration cycles by adjusting an amount of injected air and the volume of an air chamber, and when a change occurs in a raw material load and a concentration of solids in a membrane separation tank, carry out continuous aeration, and a water treatment method using the same.

Technical Solution

The present disclosure provides a submerged hollow fiber membrane unit module with a free end and a cartridge-type module including the submerged hollow fiber membrane unit modules, and its description is as follows.

The hollow fiber membrane module, or unit module are installed vertically in the water, and the unit module is closed at top and open at bottom and thus bonded to a module manifold at the bottom, and is configured to collect treated water, the manifold at the bottom of the unit module has a streamlined shape to minimize a rise speed decline of cleaning air and a flow of water, and the unit modules are received at a predetermined interval in the cartridge-type module and a water collecting part is connected thereto, so as to obtain treated water.

The manifold at the bottom of the unit module has a streamlined shape not only to allow cleaning air and a flow of water to easily pass by but also to reduce an interval between movement channels of cleaning air to increase the integrity, so a traditional cartridge-type module receives 13 to 15 unit modules while the cartridge module of the present disclosure can receive 13 to 18 unit modules. With regards to the integrity per module, the integrity per module is 21 m$^2$ higher than 16.8 m$^2$ of the traditional module, and due to an increase in inner/outer diameter of the hollow fiber membrane, a loss of pressure in the hollow fiber membrane reduces from 410/650 to 700/1200 um.

The present disclosure provides a cartridge-type hollow fiber membrane module with a free end including a hollow fiber membrane unit module with a free end and a cartridge frame, the hollow fiber membrane unit module including a manifold to which a plurality of hollow fiber membranes closed at top and open at bottom is bonded and fixed, the cartridge frame in a shape of a cube with open top and bottom and any one of four sides or two opposing sides comprising a water collecting header, a plurality of hollow fiber membrane unit modules arranged parallel to each other in a vertical direction of the water collecting header and the water collecting header having a plurality of water collecting outlets configured to communicate with the manifold.

Also, the cartridge-type hollow fiber membrane module is provided in which the bottom of the hollow fiber membrane unit module has a streamlined structure, the water collecting header of the cartridge frame has at least one water collecting outlet capable of opening or closing, and the inside of the water collecting header is configured such that the water collecting part communicates with the water collecting outlets.

Also, the cartridge-type hollow fiber membrane module has inwardly recessed grooves at four corners on the side to be held in a holding frame so that the cartridge-type hollow fiber membrane module may be stacked on the holding frame in a sliding manner, or recessed grooves are formed on the holding frame side and the cartridge-type hollow fiber membrane module has four sides with right angles so that the cartridge-type hollow fiber membrane module may be stacked on the holding frame in a sliding manner, thus leading to customized construction for installation in buildings of different heights or depths.

The present disclosure provides an air diffuser apparatus suitable for the submerged hollow fiber membrane unit module with the free end and the cartridge-type module including the submerged hollow fiber membrane unit modules with the free ends provided by the present disclosure, and its operating method, and its description is as follows.

The air diffuser apparatus suitable for the cartridge-type membrane module with the free end includes an air chamber in which a water level changes with air inflow and diffusion; an air accumulation pipe disposed in the air chamber to allow inflowing air to push water in the air chamber and compress the air to a predetermined volume; a water passage disposed in the air chamber which the water in the air chamber is allowed to enter based on whether compressed air is present or not; and a diffuser connected to the air accumulation pipe and having a plurality of pores, so the air diffuser apparatus allows for intermittent and continuous aeration.

The air diffuser apparatus capable of intermittent and continuous aeration may control aeration/non-aeration cycles through adjustment of the volume of the air chamber and an amount of inflow air, and when an amount of air is supplied higher a bit than an amount of air flow needed in intermittent aeration, newly compressed air is supplied to the diffuser before compressed air supplied from the air chamber to the diffuser completely exits through the pores of the diffuser, and thus continuous aeration of air coming out of the diffuser is possible.

Thus, dissimilar to a traditional continuous aeration method, a huge amount of air flow for continuous aeration is not needed, and a drawback that a traditional air diffuser apparatus using an airlift pump scarcely achieves continuous aeration can be solved, and as a result, benefits of aeration/non-aeration cycle control and continuous aeration contribute to adjustment of aeration cycle conditions including continuous aeration based on changes in raw water inflow load and a concentration of solids in a membrane separation tank, thereby properly attaining the goals of membrane fouling prevention and cleaning air amount reduction that may be traded off.

The air diffuser apparatus capable of intermittent and continuous aeration may be mechanically separated from and disposed below the membrane module due to a relatively small size, and properly place the air diffuser apparatus based on the shape and arrangement of the membrane, and minimize an interval of membrane modules corresponding to a bubble size and consequently maximize the membrane integrity.

Advantageous Effects

By the application of a hollow fiber membrane with a free end, mobility in the water increases, and in an aeration process for impeding the impurity clogging occurring on a traditional submerged membrane module, cleaning performance increases with a small amount of air, resulting in a reduced usage amount of cleaning air and improved energy efficiency in a water treatment process, and the likelihood of breakage of the hollow fiber membrane involved with the hollow fiber membrane with the free end reduces, thereby ensuring a long-term operation.

Also, with a short length of the hollow fiber membrane, it is easy to discharge cleaning air, an interval between cleaning air movement channels reduces which produces an effect of increasing the integrity of the hollow fiber membrane and consequently increasing the integrity per module, and an increase in inner/outer diameter of the hollow fiber membrane provides an effect of reducing a loss of pressure in the hollow fiber membrane.

In the case of a traditional hollow fiber membrane with a free end, due to a long length of the hollow fiber membrane, a support should be additionally installed to prevent the collapse, and as a consequence, a manufacturing cost increases and there is a risk of damage to the hollow fiber membrane by friction between the support and the hollow fiber membrane with flowability, but the present disclosure has advantages of eliminating the need for a support or guide to prevent the collapse, preventing the entanglement of the hollow fiber membrane, and stacking a multi-story cartridge on a cartridge due to having a short membrane length, thereby providing customized construction for installation in buildings of different heights or depths.

Also, with the use of an advantage of a replaceable cartridge-type membrane module and the short membrane length, it is easy to handle so that one person can deliver and mount, and when the hollow fiber membrane is contaminated during use, contaminants may be removed by performing high pressure water cleaning after easily taking out and turning the cartridge.

A cartridge-type membrane module with a free end using a coarse bubble generating air diffuser apparatus capable of intermittent/continuous aeration according to the present disclosure in conjunction with an air accumulation pipe may intermittently generate cleaning air with a high energy consumption ratio, so a total amount of cleaning air decreases and a capacity of an air generator required for an entire system reduces, and due to the use of the air accumulation pipe, intermittent aeration is feasible without a mechanical blocking device such as an automatic valve, thus contributing to air pipe simplification and valve elements reduction, which provides an advantage of increasing the convenience in maintenance and management, compared to a traditional intermittent aeration method based on valve control.

Also, dissimilar to a traditional continuous aeration method, a huge amount of air flow for continuous aeration is not needed, and a traditional air diffuser using an air compressor can hardly achieve substantially continuous aeration due to requiring air injection beyond an economical range for continuous aeration, but this drawback may be resolved, and as a result, benefits of aeration/non-aeration cycle control and continuous aeration contribute to adjustment of aeration cycle conditions including continuous aeration based on changes in raw water inflow load and a concentration of solids in a membrane separation tank, leading to an advantage of effectively attaining the goals of membrane fouling prevention and cleaning air amount reduction that may be traded off.

DETAILED DESCRIPTION

Figure 1:
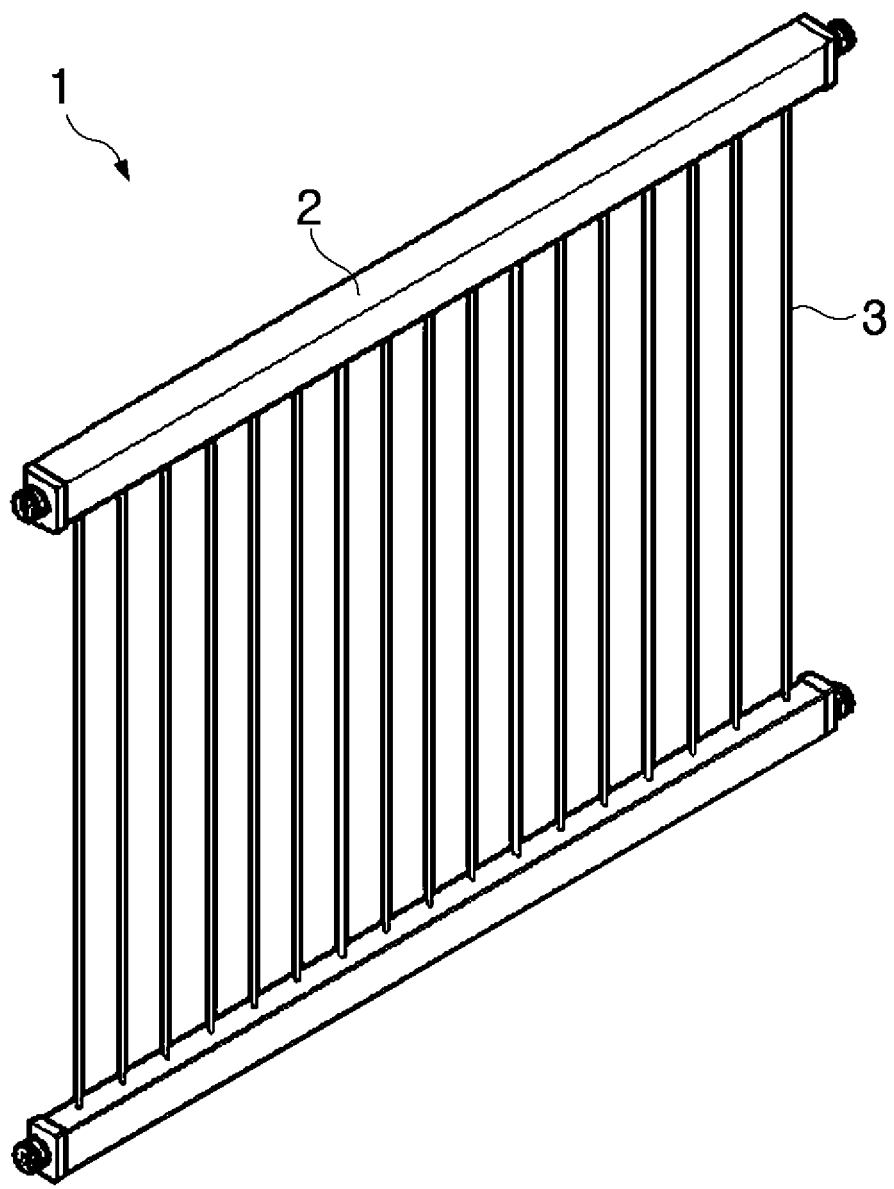
FIG. 1 is a perspective view of a hollow fiber membrane unit module fixed at both ends according to a related art.

The present disclosure provides a cartridge-type hollow fiber membrane module including a hollow fiber membrane unit module with a free end and a cartridge frame, in which the hollow fiber membrane unit module includes a manifold to which a plurality of hollow fiber membranes closed at top and open at bottom is bonded and fixed, the cartridge frame has open top and bottom with any one of four sides or opposing sides comprising a water collecting header, a plurality of hollow fiber membrane unit modules are arranged parallel to each other in a vertical direction of the water collecting header, and a treated water port disposed at both ends of the manifold is configured to communicate with the water collecting header.

Also, the cartridge-type hollow fiber membrane module is provided in which a lower portion of the manifold of the hollow fiber membrane unit module has a streamlined cross section structure, the water collecting header of the cartridge frame has at least one water collecting outlet capable of opening or closing, and the inside of the water collecting header is designed such that the water collecting part communicates with the water collecting outlet.

The water collecting header of the cartridge frame according to the present disclosure has the at least one water collecting outlet capable of opening or closing, and the inside of the water collecting header is designed such that both ends of the manifold communicate with the water collecting outlet.

The treated water port of the manifold according to the present disclosure is connected to a lower portion of the water collecting header, and the water collecting outlet is connected to an upper portion of the water collecting header, so they communicate with each other while being spaced away from each other. More preferably, an internal space of the water collecting header has any one of the following shapes; a shape with a large volume in the upper portion where the water collecting outlet is located and a large volume in the lower portion where the treated water port is located and a small volume in the middle, or a shape with a large volume in the lower portion and a small volume in the upper portion, or a shape with a volume gradually decreasing from the lower portion to the upper portion.

The cartridge-type hollow fiber membrane module according to the present disclosure may be stacked on multiple levels on a holding frame, and to this end, a recessed groove is formed in any one of the cartridge-type hollow fiber membrane module and the cartridge frame and a protruding groove corresponding to the recessed groove is formed in the other, to allow coupling and stacking in a sliding manner. More preferably, the cartridge-type hollow fiber membrane module has inwardly recessed grooves at four corners on the side and is stacked on the holding frame in a sliding manner, alternatively, the holding frame has recessed grooves and the cartridge-type hollow fiber membrane module has four sides with right angles, so the cartridge-type hollow fiber membrane module is stacked on the holding frame in a sliding manner, thereby allowing customized construction for installation in buildings of different heights or depths.

The present disclosure provides an air diffuser apparatus capable of intermittent and continuous aeration, including an air chamber in which a water level changes with air inflow and diffusion; an air accumulation pipe disposed in the air chamber to allow inflowing air to push water in the air chamber and compress the air to a predetermined volume; a water passage disposed in the air chamber which the water in the air chamber is allowed to enter based on whether compressed air is present or not; and a diffuser connected to the air accumulation pipe and having a plurality of pores. The air diffuser apparatus may be disposed below the cartridge-type hollow fiber membrane module with the free end previously described.

The air chamber is characterized in that the air chamber is closed at top and sides to allow air flowing into the air chamber to be compressed rather than immediately moving to the diffuser so that the compressed air pushes down the water in the air chamber and when the total water level reaches an inflected part of the air accumulation pipe, the compressed air moves to the diffuser at once to generate bubbles through the plurality of pores, and in this instance, the air accumulation pipe is in a shape of U or J, and the air chamber has an air inflow part through which air for use in cleaning flows into the air chamber.

The air diffuser apparatus according to an exemplary embodiment of the present disclosure is configured as follows. The air diffuser apparatus includes an air chamber in which a water level changes with air inflow and diffusion; an air pipe to allow air for use in cleaning to be connected to the air chamber; an air inflow part to allow continuous equal injection into the air chamber; an air accumulation pipe in a shape of U or J to allow inflowing air to push water in the air chamber and compress the air to a predetermined volume; a water passage disposed in the air chamber which the water in the air chamber is allowed to enter based on whether compressed air is present or not; a connection part to allow the compressed air in the air chamber to be connected to a diffuser; a diffuser having pores through which the compressed air passes to generate coarse bubbles; and an sludge outlet to prevent sludge and a solid matter from accumulating in the diffuser.

The present disclosure includes an intermittent diffuser apparatus in which the air chamber is closed at top and sides to allow air flowing into the air chamber to be compressed rather than immediately moving to the diffuser so that the compressed air pushes down the water in the air chamber and when the total water level reaches an inflected part of the air accumulation pipe in a shape of U or J, the compressed air moves the diffuser at once to generate bubbles.

The present disclosure includes an air diffuser apparatus and method in which a pore size of the diffuser maintains in the range of 3 to 7 mm smaller than a pore size of an air diffuser apparatus using an airlift pump according to a related art to generate coarse bubbles smaller than macro bubbles of the airlift pump according to the related art, so the compressed air is diffused continuously for 4 to 6 seconds, aeration/non-aeration cycles are determined by adjusting an amount of air inflow and the volume of the air chamber, and continuous aeration is feasible.

The present disclosure includes an air diffuser apparatus that is separated from and disposed below the cartridge-type membrane module with the free end, and that allows diffused bubbles to pass through membrane modules while not greatly influenced by an interval between the modules, through proper arrangement of diffusers and pores and coarse bubble generation.

An operation method for intermittent and continuous aeration using the air diffuser apparatus according to the present disclosure includes the following steps.

The intermittent aeration is feasible when operation of the air diffuser apparatus is performed by an air supply step of supplying air into an air chamber in which a water level changes with air inflow and diffusion; an air compression step of allowing air flowing into the air chamber to push water in the air chamber toward a water passage and compress the air to a predetermined volume by an air accumulation pipe; an air providing step of providing the compressed air in the air chamber to a diffuser through the air accumulation pipe; and an aeration step of providing the air moved to the diffuser to a membrane module through pores.

In the aeration step, continuous aeration is feasible in the case where the operation is performed including an air oversupply step of providing additional compressed air from the air chamber to the diffuser before aeration is terminated when the air moved to the diffuser is all provided to the membrane module through the pores.

Also, the air diffuser apparatus using the airlift pump according to the related art maintains a large pore size at a level of 1 to 3 cm and consequently generates macro bubbles, but the present disclosure generates coarse bubbles smaller than macro bubbles through the pores having a size of 3 to 7 mm. As a consequence, the air diffuser apparatus according to related art has a very short aeration time of around 1 second during which bubbles are diffused from compressed air through the air diffuser apparatus, but the present disclosure maintains an aeration duration from 4 to 6 seconds due to resistance caused by a relatively small pore size. Due to this difference, the air diffuser apparatus using the airlift pump according to the related art has an aeration time limited to a level of ¼ of the total aeration/non-aeration cycles, whereas the present disclosure may control aeration/non-aeration cycles through adjustment of the volume of the air chamber and an amount of inflow air. Also, when an amount of air is maintained higher a bit than an amount of air needed in intermittent aeration, continuous aeration is feasible, and there is no need for a huge amount of air flow for continuous aeration, so the present disclosure is more efficient in an economic aspect. The benefits of aeration/non-aeration cycle control and continuous aeration lead to an advantage of properly achieving the goals of membrane fouling prevention and cleaning air amount reduction that may be traded off, due to adjustment of aeration cycle conditions including continuous aeration based on changes in raw water inflow load and a concentration of solids in a membrane separation tank.

Besides, in the case of membrane products of the traditional air diffuser apparatus designed to generate macro bubbles, due to a large bubble size, the air diffuser apparatus is disposed near a membrane module to pass bubbles through modules. As the membrane module should maintain as much gap as a size or width of the air diffuser apparatus, a membrane area per unit volume, also known as membrane integrity reduces, which imposes a big constraint on a shape and arrangement of the membrane module. In contrast, the air diffuser apparatus of the present disclosure may be mechanically separated from and disposed below the membrane module due to a relatively small size, and has an advantage of properly placing the air diffuser apparatus based on a shape and arrangement of the membrane, and further has an advantage of minimizing an interval between the membrane modules corresponding to a bubble size and consequently maximizing the membrane integrity.

Hereinafter, preferred embodiments of the present disclosure are described in detail with reference to the accompanying drawings.

As shown in FIG. 1, a hollow fiber membrane unit module 1 fixed at both ends according to a related art includes two manifolds 2 spaced away from each other and arranged in parallel at top and bottom, and a plurality of hollow fiber membranes 3 arranged parallel to each other between the two manifolds. A plurality of hollow fiber membrane unit modules are arranged in parallel to construct a submerged hollow fiber membrane module, and one end or both ends of the manifold disposed at top and bottom of the hollow fiber membrane unit module is connected to a water collecting header to discharge treated water.

Because the general submerged hollow fiber membrane module according to the related art has a structure that the hollow fiber membrane is fixed at both ends, although air aeration or turbulence is formed by an air diffuser apparatus, there is a limitation on movement of the hollow fiber membrane. Despite a cross flow of treated water or a cleaning process by supplied air, it is not easy to remove contaminants accumulated on the hollow fiber membrane surface, and because an air diffuser apparatus is installed below the module, air is not directly transferred to the hollow fiber membrane module, so an air loss is large and a high rate of air aeration is additionally required, resulting in a high operation cost.

Figure 2:
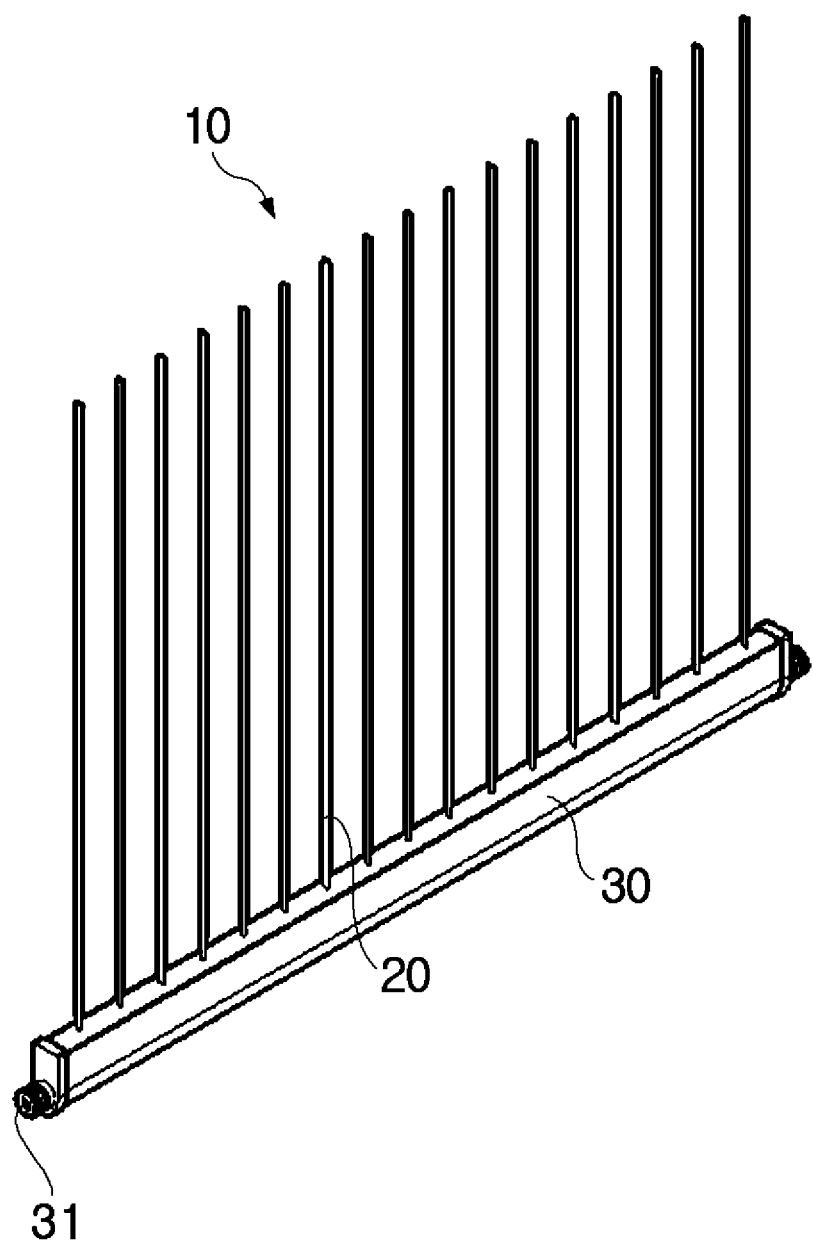
FIG. 2 is a perspective view of a cartridge-type hollow fiber membrane unit module with a free end and a streamlined cross section manifold according to an exemplary embodiment of the present disclosure.

As shown in FIG. 2, a hollow fiber membrane unit module 10 with a free end according to an exemplary embodiment of the present disclosure includes a manifold 30 to which a plurality of hollow fiber membranes 20 closed at top and open at bottom is bonded and fixed, and both ends of the manifold comprising a treated water port 31 may be connected to a water collecting header of a cartridge frame and communicate with the water collecting header to collect treated water in the water collecting header. Although FIG. 2 shows the plurality of hollow fiber membranes are individually fixed to the manifold one by one and arranged in a line, the plurality of hollow fiber membranes may be fixed to the manifold together at one point and arranged, if necessary.

The manifold 30 to which the plurality of hollow fiber membranes 20 of the hollow fiber membrane unit module 10 with the free end according to an exemplary embodiment of the present disclosure is bonded and fixed may have a rectangular cross section and a streamlined cross section. Particularly, in the case of the streamlined manifold, more preferably its cross section has a flat shape at the top where the plurality of hollow fiber membranes 20 is fixed and it is because of convenience in the bonding and fixing of the hollow fiber membranes, and more preferably, has a downward pointing streamlined shape at the bottom, so there is an advantage of a uniform flow velocity in the supply of a flow of water or air in an upward direction from the bottom of the hollow fiber membrane unit module.

Figure 3:
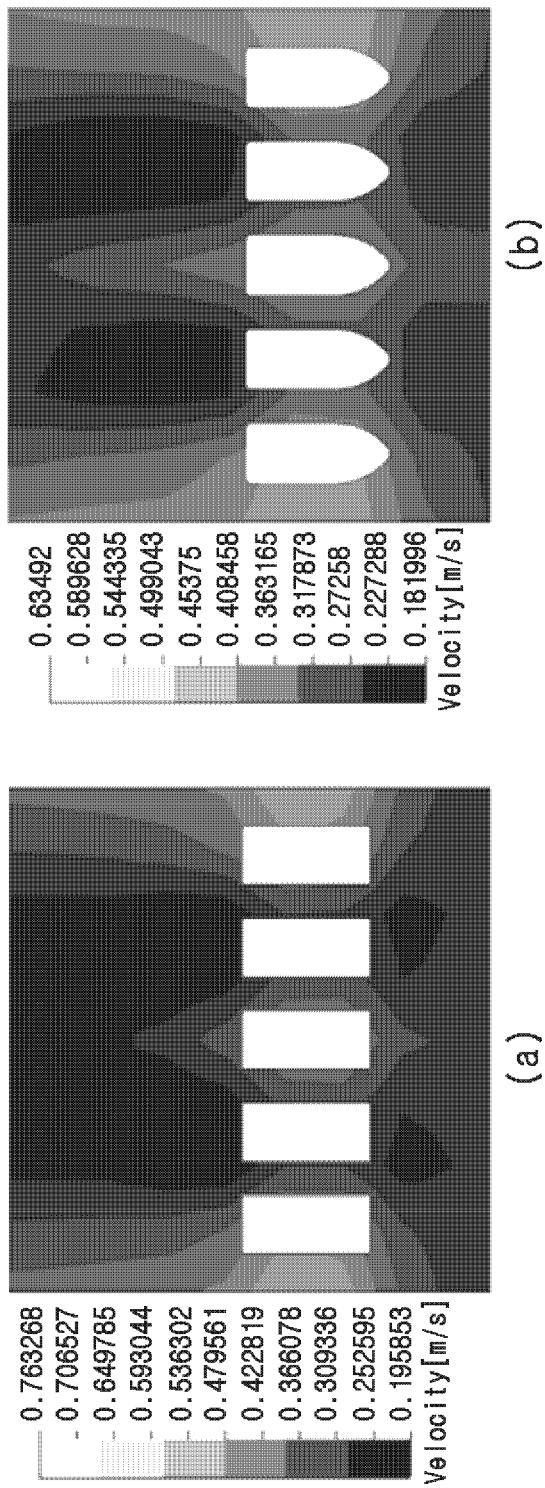
FIG. 3 is a flow velocity distribution diagram illustrating a flow velocity distribution based on a cross sectional shape for a rectangular cross section manifold and streamlined cross section manifold according to an exemplary embodiment of the present disclosure.

When the cross section of the manifold 30 of the hollow fiber membrane unit module 10 according to an exemplary embodiment of the present disclosure has a rectangular shape, its flow velocity distribution is shown in (a) of FIG. 3, and when the cross section of the manifold of the hollow fiber membrane unit module has a streamlined shape, its flow velocity distribution is shown in (b) of FIG. 3. When the cross section of the manifold has a streamlined shape, it can be seen that a flow velocity flowing along the sides of the manifold is uniform with a small difference in flow velocity between each manifold, and the flow velocity at the top, the bottom, and the sides of the manifold allows a quick flow when compared to the rectangular cross section, and accordingly, it can be said that the streamlined cross section is a more preferred structure. In a water treatment process using the submerged hollow fiber membrane, the hollow fiber membrane module including the hollow fiber membrane unit module with the streamlined cross section manifold has an equal water treatment effect between each hollow fiber membrane unit module in a flow of water flowing in the upward direction from the bottom of the hollow fiber membrane module or air aeration or a turbulence flow formed by an air diffusion apparatus and an improved cleaning effect due to a high movement speed of cleaning air supplied by the air diffuser apparatus, and because of efficient supply of a flow of water or cleaning air, has effects of increasing the integrity of the hollow fiber unit module and reducing an operation cost due to a reduction in aeration rate, also known as an amount of air supplied for use in cleaning.

Figure 4:
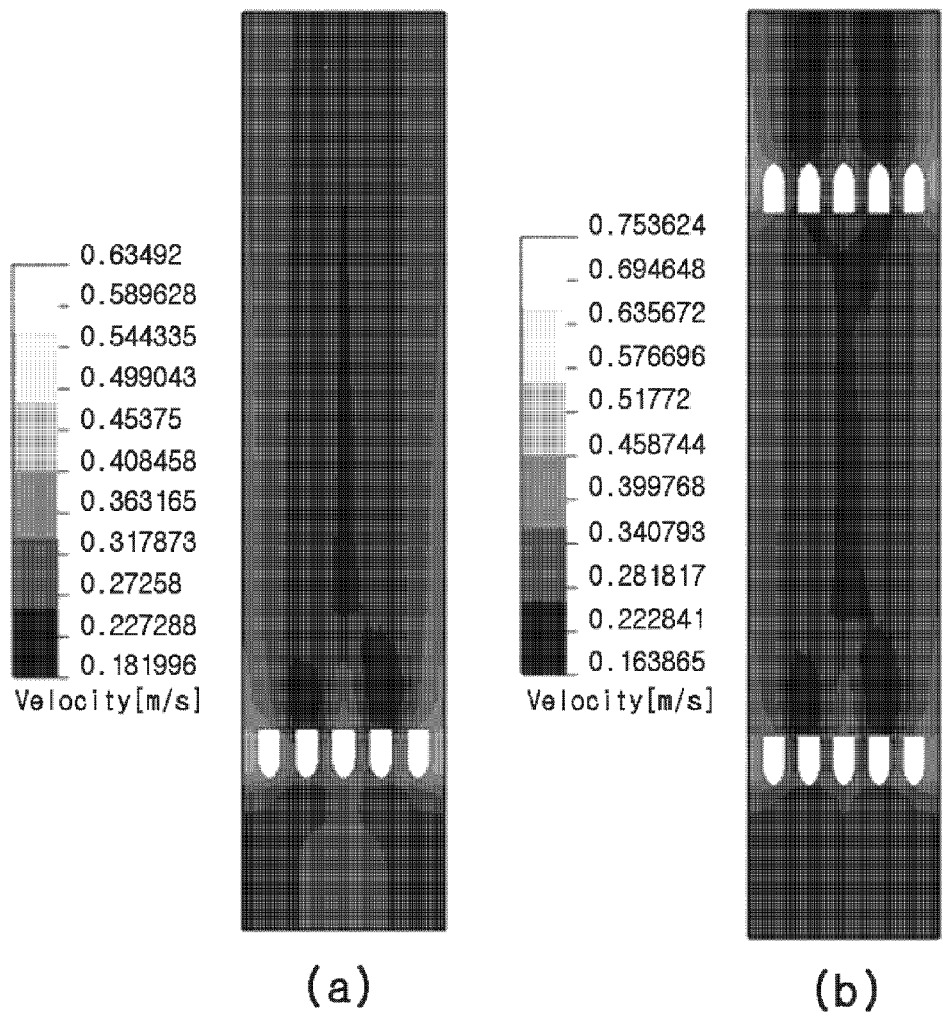
FIG. 4 is a flow velocity distribution diagram illustrating a flow velocity distribution of a module with both fixed ends and a hollow fiber membrane module with a free end according to an exemplary embodiment of the present disclosure.

(a) of FIG. 4 shows a flow velocity distribution of a hollow fiber membrane module according to an exemplary embodiment of the present disclosure, including hollow fiber membrane unit modules fixed at both ends and manifolds with a streamlined cross section to which the hollow fiber membrane unit modules are bonded, and (b) of FIG. 4 shows a flow velocity distribution of a hollow fiber membrane module according to the more preferred embodiment of the present disclosure, including hollow fiber membrane unit modules with free ends and a manifold with a streamlined cross section to which the hollow fiber membrane unit modules are bonded.

According to the flow velocity distribution of (a) of FIG. 4, in the case of the hollow fiber membrane module fixed at both ends, because of the streamlined cross section of the manifold of the unit modules, a flow velocity distribution between the unit modules is uniform and a flow velocity is high at the bottom of the hollow fiber membrane module, but due to both fixed ends, the flow velocity reduces and the flow velocity distribution is non-uniform at the central area of the unit modules connected at the top of the hollow fiber membrane module, and as a result, contaminant accumulation occurs on the hollow fiber membrane surface where the flow velocity reduces, and even if cleaning air is supplied, it is not easy to remove the accumulated contaminants.

In contrast, as shown in (b) of FIG. 3, seeing the flow velocity distribution of the hollow fiber membrane module according to the more preferred embodiment of the present disclosure, including the hollow fiber membrane unit modules with the free ends and the manifold with a streamlined cross section to which the hollow fiber membrane unit modules with the free ends are bonded, it can be seen that a flow velocity is high and a flow velocity distribution is uniform at the bottom of the manifold and the flow velocity is equally high from the top of the manifold until the bottom of the hollow fiber membranes with the free ends. As a result, in the case of the hollow fiber membrane module including the hollow fiber membrane unit modules with the free ends, the free end hollow fiber membranes capable of freely moving increase in mobility in the water with high and uniform flow velocity and reduces in membrane fouling, and in the aeration process for preventing clogging caused by impurities on the submerged membrane module, a cleaning increasing effect is produced with a small amount of air, resulting in a reduction in usage amount of cleaning air, thus leading to an energy efficiency improvement effect in the water treatment process.

Figure 5:
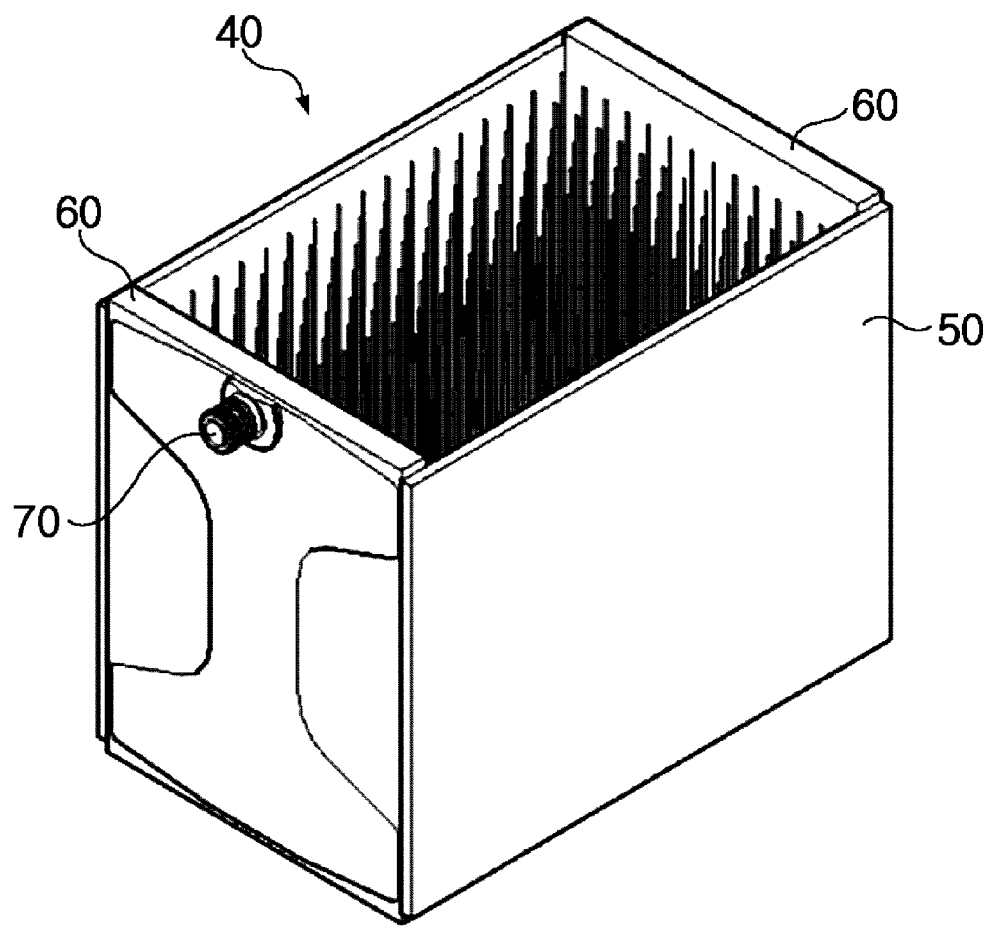
FIG. 5 is a perspective view of a cartridge-type hollow fiber membrane module with a free end according to an exemplary embodiment of the present disclosure.

As shown in FIG. 5, a cartridge-type hollow fiber membrane module 40 with a free end according to an exemplary embodiment of the present disclosure includes a cartridge frame 50 in a shape of a cube with open top and bottom and any one of four sides or two opposing sides comprising a water collecting header 60, in which the plurality of hollow fiber membrane unit modules 10 with the free ends are arranged parallel to each other in the vertical direction of the water collecting header, and the water collecting header 60 of the cartridge frame may have at least one water collecting outlet 70 capable of opening or closing. In the application to water treatment, treated water permeating the hollow fiber membranes 20 gathers in the manifold 30 and moves to the water collecting header 60 of the cartridge frame connected to the treated water port 31 at both ends of the manifold 30, and the treated water collected in the water collecting header is discharged out of the cartridge-type hollow fiber membrane module through the water collecting outlet 70.

Although FIG. 5 shows that the water collecting outlet 70 is formed at an upper portion of one side of the cartridge-type hollow fiber membrane module, the water collecting header may be formed at two opposing sides of the cartridge frame and the manifold 30 may be connected to the water collecting header 60 on the two sides of the cartridge frame, and accordingly, the water collecting outlet 70 may be formed on both sides of the water collecting header of the cartridge-type hollow fiber membrane module. In the case where the water collecting outlets 70 are formed on both sides, because there is no need to distinguish left and right, convenience in the construction and maintenance and management of the cartridge-type hollow fiber membrane module may increase.

Figure 6:
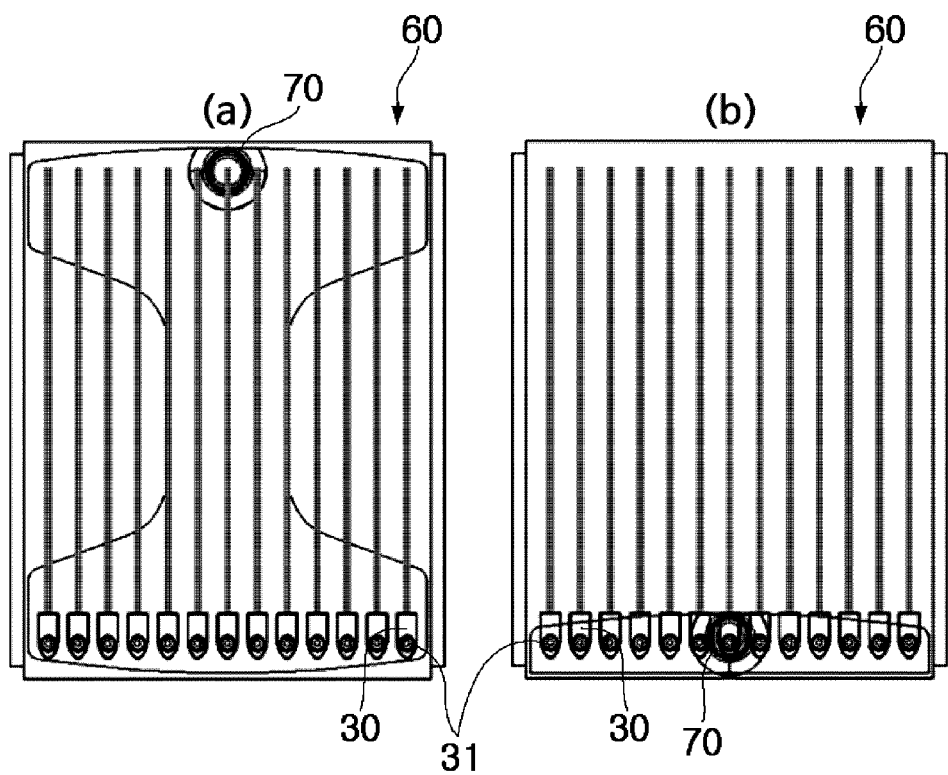
FIG. 6 is a cross sectional view illustrating an internal structure of a water collecting header of a cartridge-type hollow fiber membrane module with a free end according to an exemplary embodiment of the present disclosure.

An internal structure shape of the water collecting header of the cartridge-type hollow fiber membrane module 40 with the free end according to an exemplary embodiment of the present disclosure is shown in FIG. 6. The internal structure of the water collecting header 60 is such that water collected in the manifold 30 of the hollow fiber membrane unit module moves into the water collecting header 60 through the treated water port 31 comprising both ends of the manifold, and finally, is discharged out of the cartridge-type hollow fiber membrane module through the water collecting outlet 70 formed at the upper portion of the water collecting header.

(a) of FIG. 6 corresponds to a structure that the internal space of the water collecting header 60 is an empty space of a most common, general rectangular shape, with an advantage of being simple to form. (b) of FIG. 6 shows that the internal space of the water collecting header 60 corresponding to an exemplary embodiment of the present disclosure has a shape of a bottle with a narrow upper portion and a wide lower portion where the treated water port 31 is connected. (c) of FIG. 6 shows that the internal space of the water collecting header 60 corresponding to an exemplary embodiment of the present disclosure has a shape in which a narrow upper portion gradually becomes wider toward a lower portion where the treated water port 31 is connected. (d) of FIG. 6 shows that the internal space of the water collecting header has a structure in a shape of a dumbbell which is narrow in the middle and wide at top and bottom.

The typical structures of the internal space of the water collecting header shown in (a), (b), (c), and (d) of FIG. 6 correspond to a structure that the water collecting outlet 70 is formed at the upper portion of the water collecting header 60 and the treated water port 31 at both ends of each unit module manifold 30 is located at the lower portion of the water collecting header, with a reduced difference in distance between the treated water port 31 and the water collecting outlet 70, to contribute to effective discharge of treated water, and a difference in flow velocity between each unit module may be mitigated and each unit module may be used relatively equally, resulting in advantages of a longer service life of the cartridge-type hollow fiber membrane module and effective water treatment.

Figure 7:
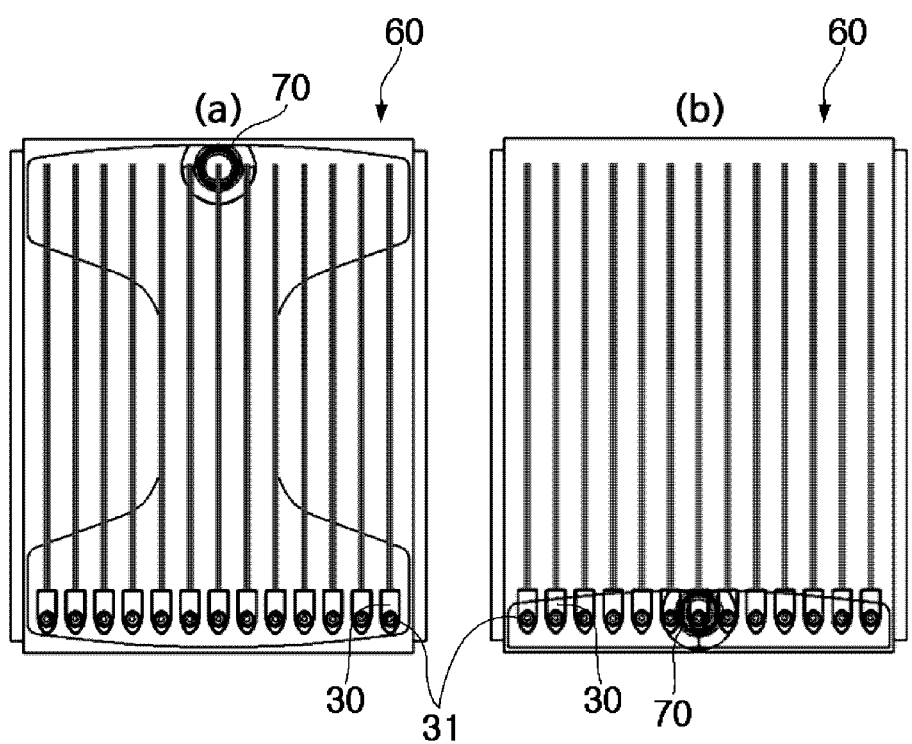
FIG. 7 is a cross section view illustrating a comparison of locations of a water collecting outlet and a water collecting header of a cartridge-type hollow fiber membrane module with a free end according to an exemplary embodiment of the present disclosure.

FIG. 7 shows a comparison of the internal structure of the water collecting header and the location of the water collecting outlet 70 in the connection of the hollow fiber membrane unit module with the free end to the water collecting header 60; (a) of FIG. 7 shows a structure in cross section that the inside of the water collecting header corresponding to one of the preferred embodiments of the present disclosure has a dumbbell-shaped structure and the water collecting outlet 70 is located at the upper portion of the water collecting header, and for comparison, (b) of FIG. 7 shows a structure in cross section that the water collecting outlet 70 is connected in a shape of a straight pipe to the lower portion of the water collecting header to which the hollow fiber membrane unit module with the free end is bonded. In a general water treatment membrane module with a free end, a connection of a water collecting outlet has a structure that the water collecting outlet is connected in a shape of a straight pipe to an area where the manifold of the unit module is located, as shown in (b) of FIG. 7.

As described in the foregoing, the (a) structure of FIG. 7 corresponds to a structure that the inside of the water collecting header has a dumbbell-shaped structure and the water collecting outlet 70 is located at the upper portion of the water collecting header, the treated water port 31 at both ends of each unit module manifold 30 is located at the lower portion of the water collecting header, which reduces a difference in distance between the treated water port 31 and the water collecting outlet 70 to achieve effective treated water discharge, thus providing advantages that a difference in flow velocity between each unit module may be mitigated and each unit module may be used relatively equally, resulting in a longer service life of the cartridge-type hollow fiber membrane module and effective water treatment, whereas the (b) structure of FIG. 7 shows a structure that the water collecting outlet 70 is connected in a shape of a straight pipe to the lower portion of the water collecting header to which the hollow fiber membrane unit module with the free end is bonded, wherein a distance between the treated water port 31 at both ends of each unit module manifold is spaced away from the water collecting outlet 70 is such that a unit module at the center is located at a very short distance from the water collecting outlet connected in a shape of a straight pipe and unit modules at both ends are located at a long distance. Thus, in this structure, an amount of water being treated in each unit module differs, and a unit module close to the water collecting outlet 70 treats a larger amount of water than a unit module distant from the water collecting outlet 70, so there is concern about increased contamination and a shorter life of a unit module of corresponding area.

Figure 8:
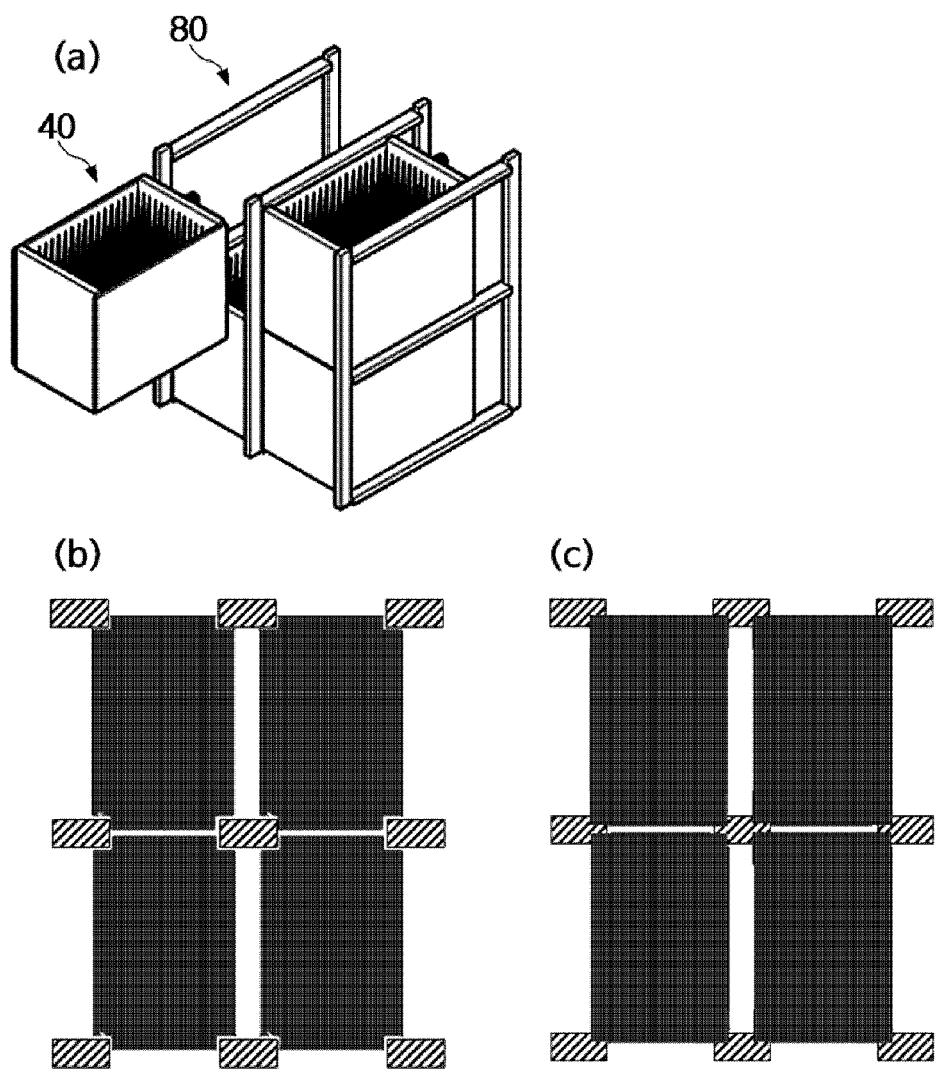
FIG. 8 is a diagram illustrating an assembly of a cartridge-type hollow fiber membrane module and a holding frame in a perspective view and in cross section according to an exemplary embodiment of the present disclosure.

As shown in FIG. 8, the cartridge-type hollow fiber membrane module 40 according to an exemplary embodiment of the present disclosure may be held in a holding frame 80. Although the cartridge-type hollow fiber membrane module described in (a) of FIG. 8 is shown as having an open structure at top and bottom and a closed structure at sides, it is obvious that an open structure at a certain side(s) may be contemplated if the cartridge-type hollow fiber membrane module has an open structure at top and bottom.

As shown in (b) of FIG. 8, the cartridge-type hollow fiber membrane module 40 has inwardly recessed grooves formed at four corners on the sides to be held in the holding frame 80, allowing stacking on the holding frame in a sliding manner, and as shown in (c) of FIG. 8, when grooves are formed on the holding frame 80 side and the cartridge-type hollow fiber membrane module has the sides with right angles, similarly, the cartridge-type hollow fiber membrane module may be stacked in the holding frame in a sliding manner.

Figure 9:
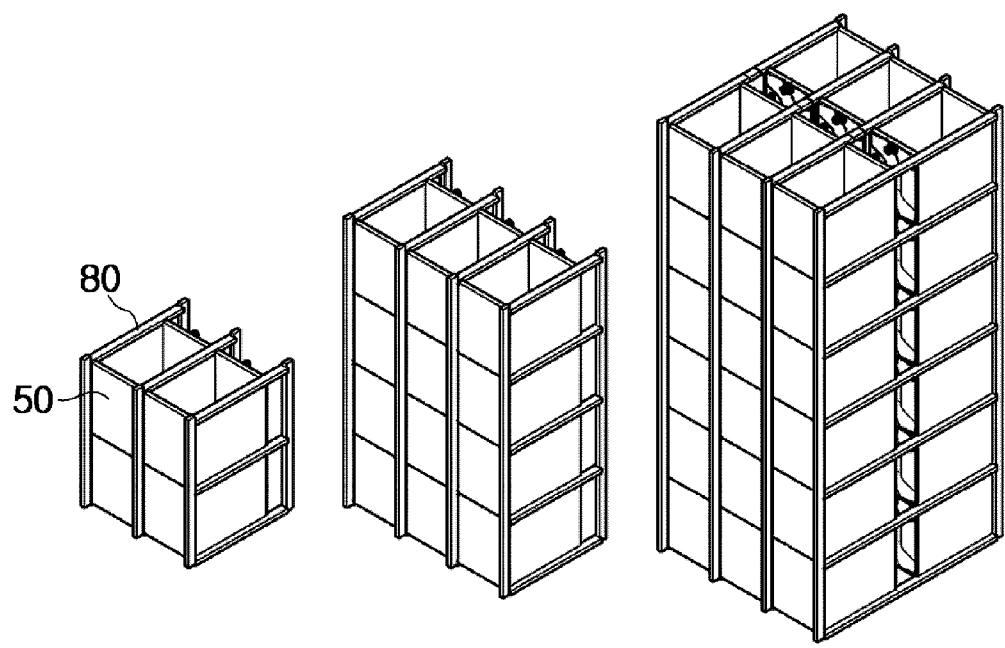
FIG. 9 is a perspective view of customized construction for installation in buildings of different heights or depths using an assembly of a cartridge-type hollow fiber membrane module and a holding frame according to an exemplary embodiment of the present disclosure.

FIG. 9 is a conceptual diagram illustrating, in the mounting of the cartridge-type hollow fiber membrane module 40 of the present disclosure in the holding frame 80, customized construction for installation in buildings of different heights or depths, and the frame may be increased in height by stacking up multiple storeys, for example, two, four, six, or higher, based on the heights or depths, and may be horizontally extended or expanded for construction over a wide area. As described in (b), and (c) of FIG. 8 previously noted, a connection method of the frame and the cartridge-type hollow fiber membrane module is based on a sliding manner that forms a recessed groove structure at any one side and a shape of a protruding groove at the opposite side and connects them.

Figure 10:
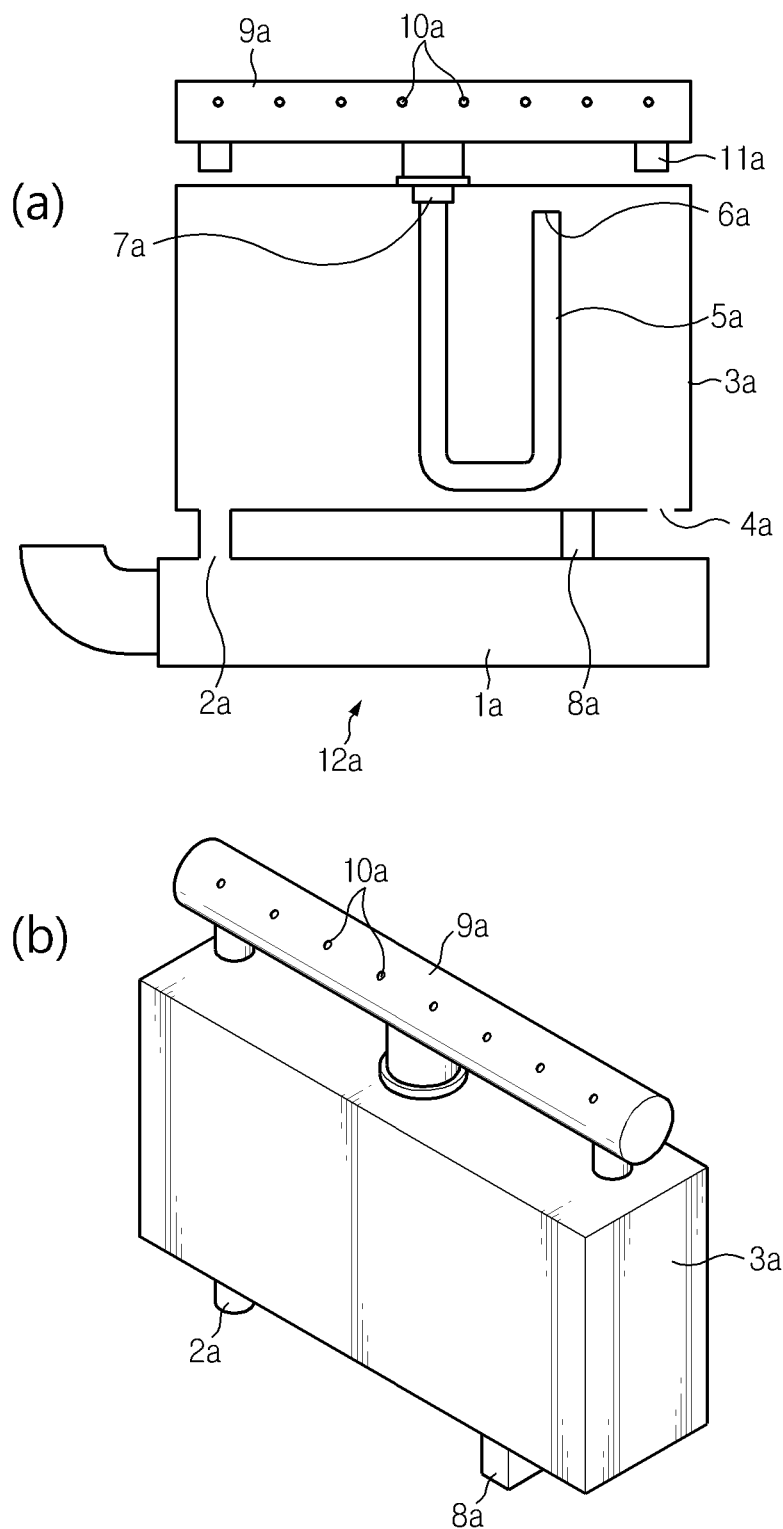
FIG. 10 is a diagram illustrating an air diffuser apparatus capable of intermittent and continuous aeration in cross section and a perspective view according to an exemplary embodiment of the present disclosure.

FIG. 10 illustrates an air diffuser apparatus suitable for the cartridge-type membrane module with the free end according to a preferred embodiment of the present disclosure. As described in the disclosure of FIG. 10, a coarse bubble air diffuser apparatus capable of intermittent/continuous aeration in conjunction with an air accumulation pipe includes a coarse bubble generator including an air branch pipe 1a to allow cleaning air flowing in through a main air pipe of a membrane filtration system (cassette or frame) to be connected to an individual air chamber; an air inflow part 2a to allow continuous equal injection of air from the air branch pipe 1a into each air chamber; an air chamber 3a in which air flowing in through the air inflow part 2a and water, particularly, water in a membrane separation tank co-exist, the air chamber 3a being closed at top and sides except a diffuser connection part 7a so that a water level in the air chamber 3a changes with air inflow and diffusion; a horizontal support 8a to maintain the water level in the air chamber 3a in a horizontal state by fixing the air chamber 3a to the air pipe, an air accumulation pipe 5a in a shape of U or J disposed in the air chamber 3a to accumulate air flowing in through the air inflow part 2a from the top of the air chamber 3a by buoyancy while compressing the air to a predetermined volume so that the compressed air is transferred through a diffuser connection part 7a; a water passage 4a which water is allowed to enter based an amount of air accumulated in the air chamber 3a; an air accumulation pipe inlet 6a through which the air and water in the air chamber 3a enters the air accumulation pipe 5a; a diffuser connection part 7a to allow the compressed air in the air chamber 3a to be connected to a diffuser through the air accumulation pipe 5a; a diffuser 9a to diffuse the compressed air flowing in through the diffuser connection part 7a into bubbles through pores; pores 10a to generate the compressed air into coarse bubbles; and a sludge outlet 11a to prevent accumulation of sludge and solids in the diffuser 9a.

The air branch pipe 1a is connected to a plurality of air chambers 3a through a plurality of air inflow parts 2a, the air chambers 3a are arranged in parallel on the air branch pipe, and cleaning air flows into the air branch pipe 1a continuously after passing through the main pipe of the membrane filtration system. Also, to prevent the movement due to the buoyancy generated by injecting air into the air chamber 3a, the horizontal support 8a is installed to mechanically fix the air chamber 3a to the air branch pipe 1a and maintain the water level under the compressed air in the air chamber 3a to be parallel to the air branch pipe 1a.

Figure 11:
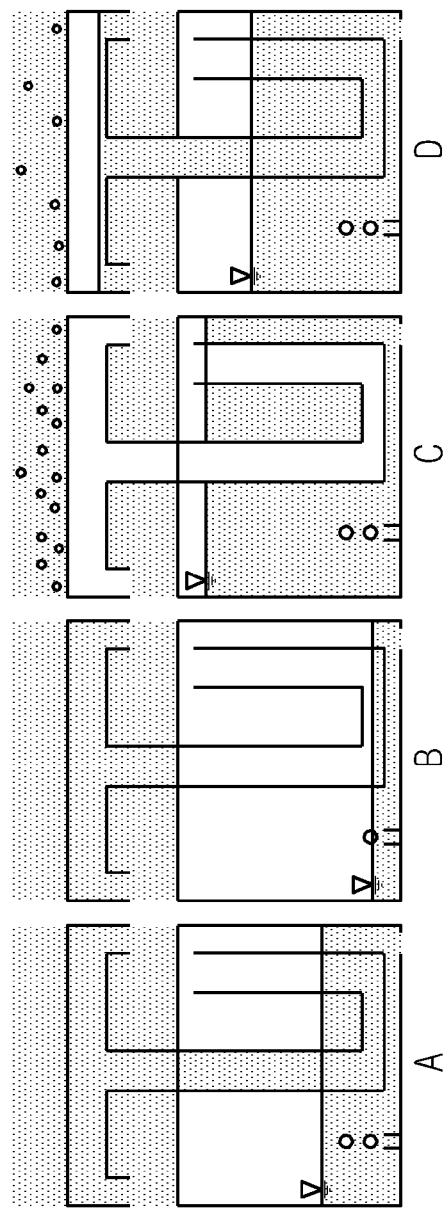
FIG. 11 is a schematic diagram illustrating the concept of air flowing in through an air accumulation pipe being discharged through a diffuser according to an exemplary embodiment of the present disclosure.

In the air diffuser apparatus suitable for the cartridge-type membrane module with the free end, a step of compressing air flowing into the air chamber 3a and providing the compressed air to the diffuser is described in detail with reference to FIGS. 10 and 11.

The air inflow part 2a allows air to enter the air chamber 3a, and its size may be adjusted to flow an equal amount of air into each air chamber 3a. Also, the air inflow part 2a maintains a predetermined distance from the water passage 4a with an aim of a smooth access of water. Because the air chamber 3a is closed at the top and sides, air flowing into the air chamber 3a accumulates from the top to generate the air pressure. Thus, water in the air chamber 3a goes out through the water passage 4a, which results in a change in water level in the air chamber 3a.

As compressed air flows in through the air accumulation inlet 6a, the water level in the air accumulation pipe 5a becomes equal to the water level as the water level in the air chamber 3a, and when the water level reduces down to an inflected part or a curved part of the air accumulation pipe 5*a*, air is discharged through the diffuser connection part 7*a*. As compressed air in the air chamber 3*a* is transferred to the diffuser 7*a* at once, water flows into the air chamber 3*a* again through the water passage 4*a*, so the water level is constantly maintained. In this instance, no matter whether that air accumulates in the air chamber 3*a* and is transferred to the diffuser 7*a*, air flows in constantly through the air inflow part 2*a*, and considering a time during which water moves again through the water passage 4*a*, a maximum water level in the air chamber 3*a* is lower than the top of the air chamber 3*a*. The maximum water level is determined by an amount of air inflow, the volume of the air chamber 3*a*, and a size of the water passage 4*a*.

The air transferred to the diffuser 9*a* pushes out water in the diffuser 9*a* and is diffused into bubbles through the pores 10*a*. By a pore size, coarse bubbles are created, and discharged continuously for 4 to 6 seconds based on an amount of air inflow, the volume of the air chamber 3*a*, and a cross sectional area of the pores. An aeration time during which bubbles are generated and a non-aeration time during which bubbles are not generated is determined based on whether compressed air flows into the diffuser 9*a*, and thus, it can be said that aeration diffused through the diffuser 9*a* is intermittent rather than continuous. Also, when an amount of air flowing in through the air inflow part 2*a* increases, the non-aeration time reduces, and aeration/non-aeration cycles may be adjusted based on the operation conditions of the membrane separation tank.

For the same volume of the air chamber 3*a*, when an amount of air flowing in through the air inflow part 2*a* is larger than a predetermined level, newly compressed air flows in through the diffuser 9*a* before air flowing in through the diffuser 9*a* is all diffused through the pores 10*a*, so there is no non-aeration time. That is, when the amount of inflow air is larger than the predetermined level, continuous aeration is possible. This phenomenon contributes to the feature of the present disclosure that it takes 4 to 6 seconds to discharge bubbles based on the size of the pores 10*a*, and in contrast, a traditional air diffuser apparatus designed to generate macro bubbles needs an excessive amount of air for continuous aeration and thus is realistically infeasible.

The compressed air transferred to the inside of the diffuser 9*a* spreads to both ends of the diffuser 9*a*, and bubbles are generated through all the pores of the diffuser 9*a*. At the same time, water moves from inside to outside through the sludge outlet 11*a*, and as the air pressure in the diffuser 9*a* reduces, water may flow in through the sludge outlet 11*a* again. As water in the diffuser 9*a* is discharged smoothly through the sludge outlet 11*a* at a predetermined cycle, sludge and solid sediment does not stay in place.

Figure 12:
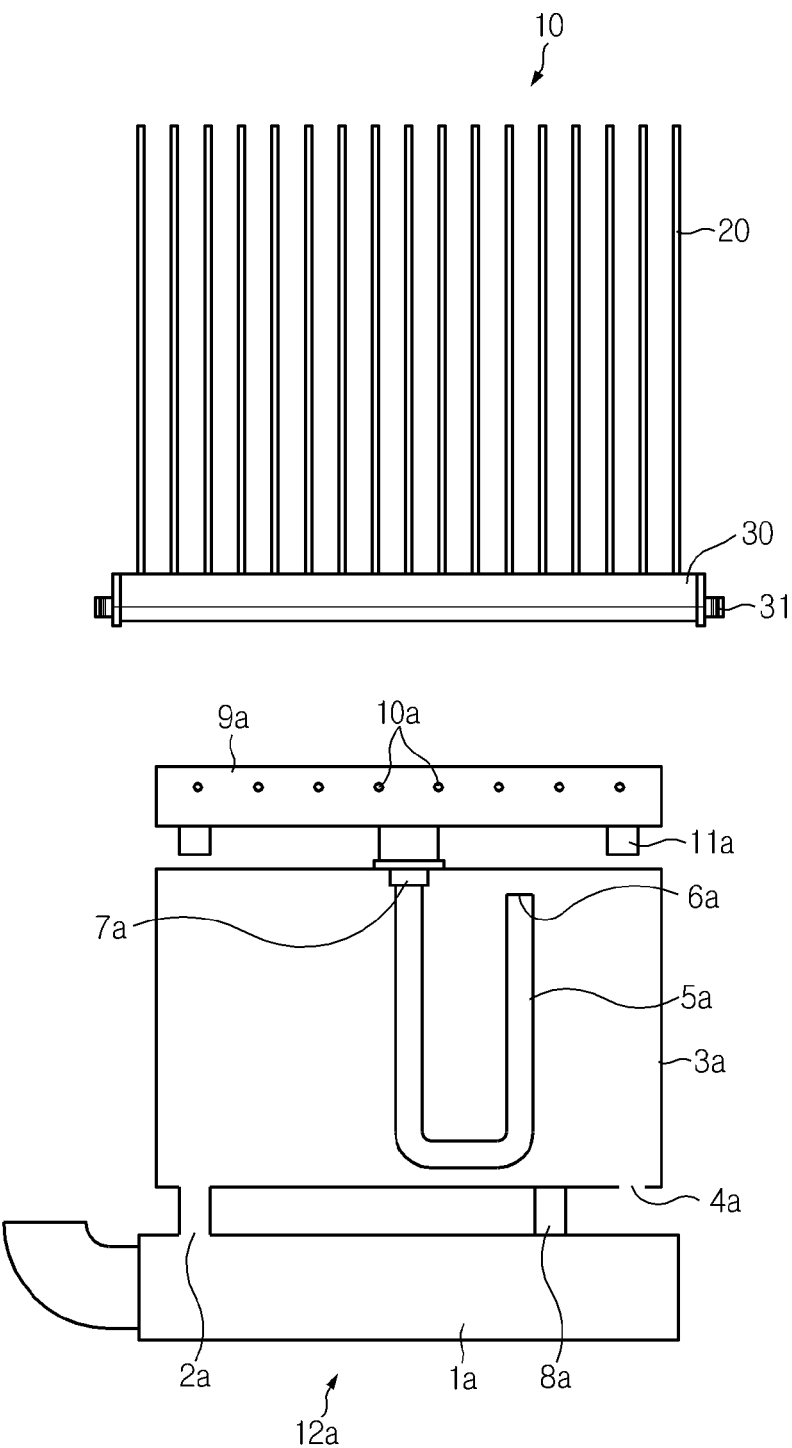
FIG. 12 is a conceptual diagram illustrating assembling of a hollow fiber unit module with a free end above an air diffuser apparatus capable of intermittent and continuous aeration according to an exemplary embodiment of the present disclosure.

FIG. 12 is a cross-sectional view illustrating that the hollow fiber unit module with the free end is assembled above the air diffuser apparatus capable of intermittent and continuous aeration, and as described in the foregoing, when the hollow fiber unit module is assembled above the air diffuser apparatus capable of intermittent and continuous aeration, compressed air transferred to the inside of the diffuser 9*a* passes through all the pores of the diffuser to generate bubbles, and the generated bubbles move up and come into contact with the overall hollow fiber unit module with the free end equally, thereby effectively removing contaminants deposited on the membrane surface.

Figure 13:
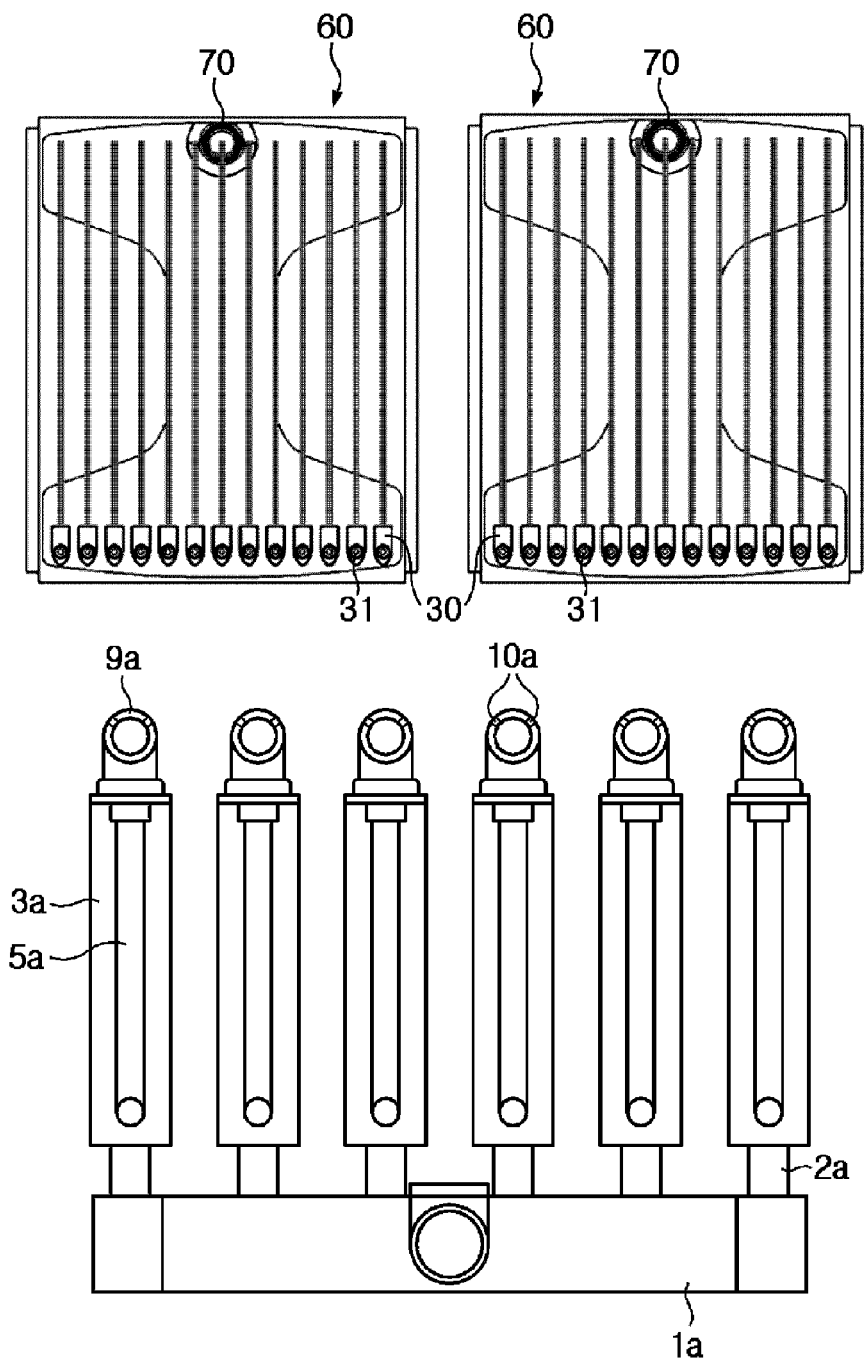
FIG. 13 is a conceptual diagram illustrating assembling of an air diffuser apparatus having a plurality of diffusers below cartridge-type hollow fiber modules with free ends connected in parallel according to an exemplary embodiment of the present disclosure.

FIG. 13 is a cross sectional view illustrating a plurality of air diffuser apparatuses are connected in parallel to an air pipe and cartridge-type hollow fiber modules with free ends are assembled in parallel above the air diffuser apparatus to increase integrity, and the air diffuser apparatus of the present disclosure may be mechanically separated from and disposed below the membrane module due to a relatively small size, and has an advantage of properly placing the air diffuser apparatus based on the shape and arrangement of the membrane, and further has an advantage of minimizing an interval between the membrane modules corresponding to a bubble size and consequently maximizing the membrane integrity. In the air aeration or a flow of turbulence by the air diffuser apparatus, there are effects of equal water treatment between each hollow fiber membrane unit module and improved cleaning due to a high movement speed of cleaning air supplied by the air diffuser apparatus, and efficient supply of a flow of water or cleaning air is achieved, so the integrity of the hollow fiber unit module may increase and an operation cost reduction effect is provided due to a reduction in an aeration rate, i.e., an amount of air supplied for use in cleaning.

INDUSTRIAL APPLICABILITY

By the application of the hollow fiber membrane with the free end, mobility in the water increases, and in an aeration process for impeding the impurity clogging occurring on a traditional submerged membrane module, cleaning performance increases with a small amount of air, resulting in a reduced usage amount of cleaning air and improved energy efficiency in a water treatment process, and the likelihood of breakage involved with the hollow fiber membrane with the free end reduces, thereby ensuring a long-term operation. Also, the cartridge-type membrane module with the free end using the coarse bubble generating air diffuser apparatus capable of intermittent/continuous aeration in conjunction with the air accumulation pipe intermittently generates cleaning air with a high energy consumption ratio, so a total amount of cleaning air decreases and a capacity of an air generator required for an entire system reduces, and due to the use of the air accumulation pipe, intermittent aeration is feasible without a mechanical blocking device such as an automatic valve, thus contributing to air pipe simplification and valve elements reduction, which provides an advantage of increasing the convenience in maintenance and management compared to an intermittent aeration method based on traditional valve control, leading to effective use in water treatment industry.

What is claimed is:

1. A submerged water treatment apparatus comprising:
  a cartridge-type hollow fiber membrane module with a free end, the cartridge-type hollow fiber membrane module with the free end comprising:
    a hollow fiber membrane unit module with a free end;
    a cartridge frame having an open top and bottom, and any one of four sides or two opposing sides comprising a water collecting header; and
    a manifold to which a plurality of hollow fiber membranes is bonded and fixed, the hollow fiber membranes being closed at a top and open at a bottom;
  wherein:
    a plurality of hollow fiber membrane unit modules are arranged parallel to each other in a vertical direction of the water collecting header, and a treated water port disposed at both ends of the manifold is configured to communicate with the water collecting header; and
    an internal space of the water collecting header has a structure in a shape of a dumbbell which is narrow in the middle and wide at top and bottom ends in the vertical direction; and an air diffuser apparatus disposed below the cartridge-type hollow fiber membrane module with the free end, the air diffuser apparatus comprising:
an air chamber in which a water level changes with air inflow and diffusion;
an air accumulation pipe disposed in the air chamber to allow inflowing air to push water in the air chamber and compress the air to a predetermined volume;
a water passage disposed in the air chamber which the water in the air chamber is allowed to enter based on whether compressed air is present or not; and
a diffuser connected to the air accumulation pipe and having a plurality of pores;
wherein the air chamber is closed at top and sides to allow air flowing into the air chamber to be compressed rather than immediately moving to the diffuser so that the compressed air pushes down the water in the air chamber and when a total water level reaches an inflected part of the air accumulation pipe, the compressed air moves to the diffuser at once to generate bubbles through the plurality of pores.

2. The submerged water treatment apparatus according to claim 1, wherein the air accumulation pipe is in a shape of U or J.

3. The submerged water treatment apparatus according to claim 2, wherein the air accumulation pipe is in the shape of the U.

4. The submerged water treatment apparatus according to claim 2, wherein the air accumulation pipe is in the shape of the J.

5. The submerged water treatment apparatus according to claim 2, wherein the air accumulation pipe in the shape of the U or the J extends from one end at a diffuser connection part to an air accumulation inlet at an other end of the air accumulation pipe, the air accumulation inlet being the only inlet of the air accumulation pipe between the one end and the other end.

6. The submerged water treatment apparatus according to claim 1, wherein the air chamber comprises an air inflow part through which air for use in cleaning flows into the air chamber.

7. The submerged water treatment apparatus according to claim 1, wherein the vertical direction of the water collecting header has a height which is greater than a height in the vertical direction of the plurality of hollow fiber membrane unit modules.

8. The submerged water treatment apparatus according to claim 7, wherein the water collecting header has a width which is greater than a collective width of the plurality of hollow fiber membrane unit modules when assembled in the cartridge frame.

9. The submerged water treatment apparatus according to claim 1, wherein the water collecting header has a width which is greater than a collective width of the plurality of hollow fiber membrane unit modules when assembled in the cartridge frame.

10. The submerged water treatment apparatus according to claim 1, wherein a water collecting outlet is located at an upper portion of the water collecting header.

11. The submerged water treatment apparatus according to claim 1, wherein a water collecting outlet is connected in a shape of a straight pipe to a lower portion of the water collecting header to which the plurality of hollow fiber membrane unit modules are bonded.

12. An aeration method of the submerged water treatment apparatus defined in claim 1, comprising:
an air supply step of supplying air into the air chamber in which the water level changes with air inflow and diffusion;
an air compression step of allowing air flowing into the air chamber to push water in the air chamber toward the water passage and compress the air to a predetermined volume by the air accumulation pipe;
an air providing step of providing the compressed air in the air chamber to the diffuser through the air accumulation pipe; and
an aeration step of providing the air moved to the diffuser to the membrane module through the pores.

13. The aeration method of the submerged water treatment apparatus according to claim 12, further comprising:
an air oversupply step of providing additional compressed air from the air chamber to the diffuser before aeration is terminated when the air moved to the diffuser is all provided to the membrane module through the pores in the aeration step.

14. A submerged water treatment apparatus comprising:
a cartridge-type hollow fiber membrane module with a free end, the cartridge-type hollow fiber membrane module with the free end comprising:
a hollow fiber membrane unit module with a free end;
a cartridge frame having an open top and bottom, and any one of four sides or two opposing sides comprising a water collecting header; and
a manifold to which a plurality of hollow fiber membranes is bonded and fixed, the hollow fiber membranes being closed at a top and open at a bottom;
wherein a plurality of hollow fiber membrane unit modules are arranged parallel to each other in a vertical direction of the water collecting header, and a treated water port disposed at both ends of the manifold is configured to communicate with the water collecting header; and
an air diffuser apparatus disposed below the cartridge-type hollow fiber membrane module with the free end, the air diffuser apparatus comprising:
an air chamber in which a water level changes with air inflow and diffusion;
an air accumulation pipe disposed in the air chamber to allow inflowing air to push water in the air chamber and compress the air to a predetermined volume;
a water passage disposed in the air chamber which the water in the air chamber is allowed to enter based on whether compressed air is present or not; and
a diffuser connected to the air accumulation pipe and having a plurality of pores; wherein:
the air chamber is closed at top and sides to allow air flowing into the air chamber to be compressed rather than immediately moving to the diffuser so that the compressed air pushes down the water in the air chamber and when a total water level reaches an inflected part of the air accumulation pipe, the compressed air moves to the diffuser at once to generate bubbles through the plurality of pores;
the air accumulation pipe is in a shape of U or J and extends from one end at a diffuser connection part to an air accumulation inlet at an other end of the air accumulation pipe, the air accumulation inlet being the only inlet of the air accumulation pipe between the one end and the other end.

* * * * *